United States Patent [19]

Ibi

[11] Patent Number: 5,206,942
[45] Date of Patent: Apr. 27, 1993

[54] PARTIALLY STORING CONTROL CIRCUIT USED IN A MEMORY UNIT

[75] Inventor: Takashi Ibi, Kawasaki, Japan

[73] Assignee: Fujitsu Limited, Kawasaki, Japan

[21] Appl. No.: 490,447

[22] Filed: Mar. 8, 1990

[30] Foreign Application Priority Data

Mar. 8, 1989 [JP] Japan ................... 1-055407

[51] Int. Cl.[5] ................ G06F 12/00; G06F 12/04; G11C 8/00
[52] U.S. Cl. .................... 395/425; 365/230.03; 365/189.05; 364/256.8; 364/254.9; 364/DIG. 1
[58] Field of Search ............ 365/230.03, 230.04, 365/189.01, 189.05; 395/425; 364/200 MS File

[56] References Cited

U.S. PATENT DOCUMENTS

| 3,883,854 | 5/1975 | Heinberg et al. | |
|---|---|---|---|
| 4,467,419 | 8/1984 | Wakai | 364/200 |
| 4,601,018 | 7/1986 | Baum et al. | 365/230.04 |
| 4,675,808 | 6/1987 | Grinn et al. | 365/230.04 |
| 4,713,759 | 12/1987 | Yamagishi et al. | 364/200 |
| 4,755,933 | 7/1988 | Teshima et al. | 364/200 |
| 4,773,048 | 9/1988 | Kai | 364/200 |
| 4,797,850 | 1/1989 | Amitai | 395/425 |
| 4,937,781 | 6/1990 | Lee et al. | 395/425 |
| 5,060,145 | 10/1991 | Scheuneman et al. | 395/425 |

OTHER PUBLICATIONS

Patent Abstracts of Japan, vol. 11, No. 219 (p. 596) (2666) Jul. 16, 1987 & JP-A-62 038 953 (Fujitsu Ltd), Feb. 19, 1987.

*Primary Examiner*—Alyssa H. Bowler
*Attorney, Agent, or Firm*—Staas & Halsey

[57] ABSTRACT

Partial-store access in which a portion of data is changed, is performed using a plurality of memory banks in a memory unit. The partial store-access is performed through an interleave method in which read-data which is one word in length is read from the memory banks during an access time. The one word write-data including a portion of data which is to be changed, is registered in store-data registers. The portion of data is changed in an overwriting operation within the access time. When more than one portion of data is to be changed, such portion is also changed within the access time, but within a different register (i.e., at a later time) than the portion of the storing data initially changed. A positional signal indicating the position of the storing data which is to be changed, is stored in position-signal registers. The portions of the storing data which have been changed are combined using the positional signals, with the one word read-data read from the memory banks, thus producing rewrite-data after the access time. The rewrite-data is then restored in the memory banks.

29 Claims, 6 Drawing Sheets

PARTIALLY STORING CONTROL CIRCUIT USED IN A MEMORY UNIT

FIELD OF THE INVENTION

The present invention relates to a partially storing control circuit used in a memory unit having a memory device divided into a plurality of memory banks so that access can be performed to the memory banks so that access can be performed to the memory device, using a memory bank as a unit, through an interleave method.

In a memory unit of a computing system, an interleave method has been used for reducing a practical access time of a memory device. When the interleave method is applied to the memory unit, a memory device in the memory unit is divided into a plurality of memory banks so that memory access can be performed to the memory banks in partially parallel every memory cycle. To carry out the interleave method effectively, the access to the memory device is also divided in proportion to the number of the memory banks and performed by using a store-data pipeline and a bank-address pipeline both provided in the memory unit.

In the latest computing system, a dynamic random access memory (DRAM) is applied to the memory device for reducing the selling price. However, since the DRAM requires a long access time in comparison with a static random access memory (SRAM), a great many stages of the store-data pipeline and the bank-address pipeline must be provided for making the memory unit operate in synchronization with a high processing speed of a central processing unit (CPU). IN particular, when a partial-store merge access, which is the latest memory access method for improving process efficiency of the computing system, is applied to the memory unit, circuits for controlling the partial-store merge access increases extremely in hardware with the increase in the number of stages of the store-data pipeline and the bank-address pipeline.

DESCRIPTION OF THE RELATED ART

The related art of a memory unit including a partial-store control circuit will be explained in reference to FIGS. 1(a), 1(b) and 1(c).

Figure 1A:
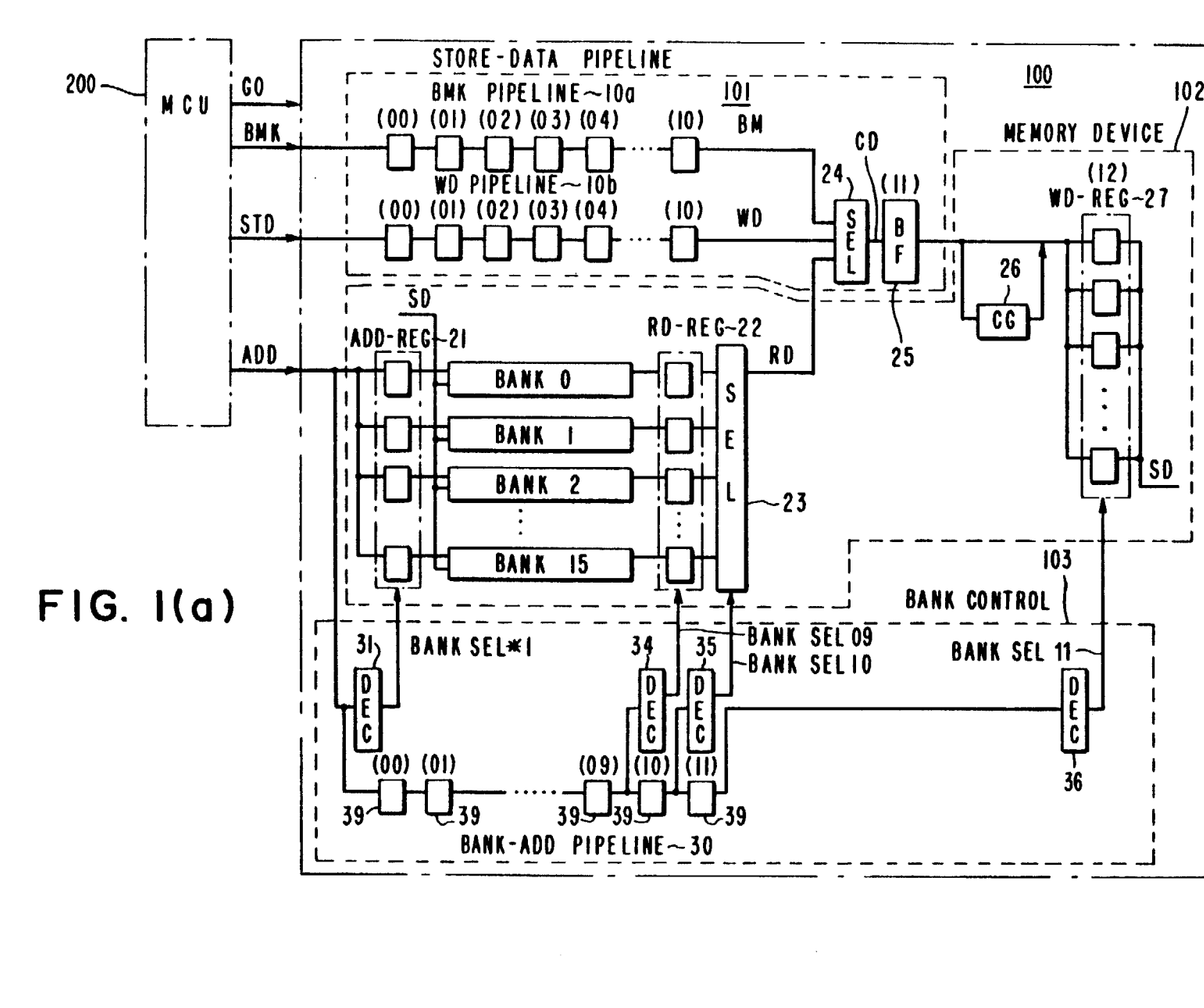
FIG. 1(a) is a schematic block diagram for illustrating function of a related art of the present invention regarding a partially storing control circuit used in a memory unit.

FIG. 1(a) shows main constitution of a memory unit MU 100 of the related art. As shown in FIG. 1(a), memory unit MU 100 mainly consists of a memory device (MEMORY DEVICE) 102, a store-data pipeline (STORE-DATA PIPELINE) 101 and a bank-control (BANK CONTROL) 103. As shown by signal lines GO, STD, ADD and BMK in FIG. 1(a), memory unit MU 100 is controlled by a memory control unit (MCU) 200. Command signal GO represents a command signal for starting the partial-store access in memory unit MU 100. Storing data signal STD represents storing data to be stored in the memory device 102. The storing data STD consists of one word in which at least one byte of data for partially storing in the MEMORY DEVICE 102 is included. Address signal ADD represents a signal of an address for the storing data STD to be partially stored in MEMORY DEVICE 102. Byte mark signal BMK represents a byte mark signal for specifying the position of a byte within the storing data signal STD where the byte data to be partially stored exists.

In this explanation, it will be defined for simplicity that the storing data STD is one-word data consisting of four bytes and MEMORY DEVICE MD 102 is divided into sixteen memory banks (BANK 0, BANK 1, BANK 2, BANK 3, ..., BANK 14 and BANK 15) in FIG. 1(a) so that each memory bank BANK includes a plurality of words of data.

The address signal ADD includes a plurality of address bits in which its four low-order bits specify a BANK of the sixteen memory banks (BANK0-BANK16). Each BANK includes one-word data to be replaced partially by the storing data STD. Other high-order bits of the address signal ADD specify one-word data within a BANK. The use of the address signal ADD in memory unit MU 100 will now be explained concretely in reference to FIGS. 1(a) and 1(b).

Figure 1B:
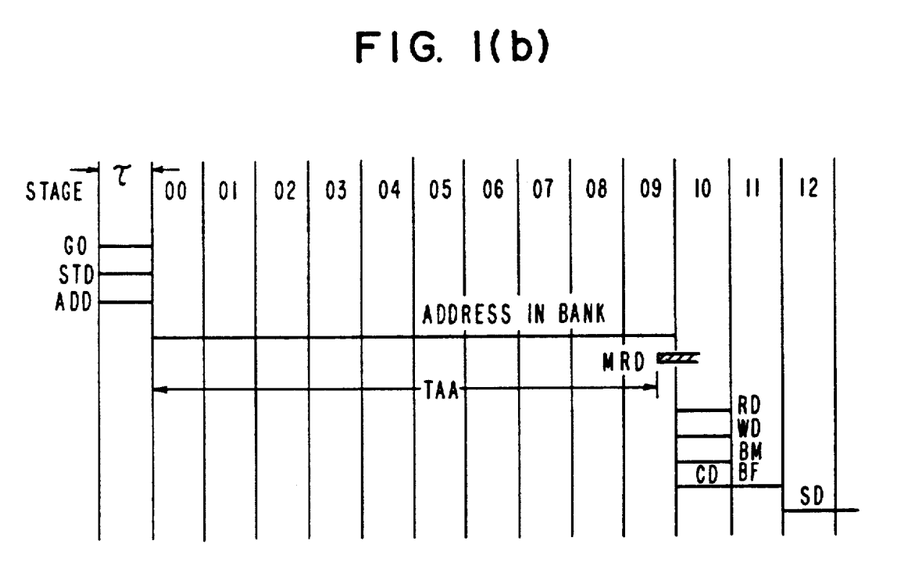
FIG. 1(b) is a timing chart for showing the access time of partial-store access and timing of signals provided in the partially storing control circuit in case of the related art.

FIG. 1(b) is a timing chart for explaining the partial-store access and the partial-store merge access performed in memory unit MU 100. In FIG. 1(b), a letter "τ" represents a time interval of a clock signal sent from memory control unit MCU 200 (a signal line for the clock signal is not depicted in FIG. 1(a)). Compound numerals (such as 00, 01, 02, ..., 11 and 12) represent stages of the pipelines.

When the address signal ADD is sent to memory unit MU 100 from memory control unit MCU 200, the address signal ADD is sent to a decoder DEC 31 in a BANK CONTROL 103 and to an address register ADD-REG 21 in the MEMORY DEVICE 102. A first bank-select signal BANK SEL*1 for selecting a BANK is produced from decoder DEC 31 by decoding the address signal's four DEC 31 by decoding the low-order bits. The bank select signal BANK SEL*1, sent to ADD-REG 21, selects one of the sixteen banks (BANK0-BANK 15); a BANK thus selected will be called a "selected BANK" hereinafter. Meanwhile, the address signal's high-order bits are sent to the selected BANK through the address register ADD-REG 21 and used for selecting one-word data to be partially stored (or replaced) with storing data STD.

When one of the sixteen banks (BANK0-BANK 15) is selected by bank select signal BANK SEL*1 and the address signal's high-order bits are sent to the selected BANK via the address register ADD-REG 21, the one-word data to be replaced by the storing data STD, which is called memory read data MRD hereinafter, is read out of the selected BANK and stored in read data register RD-REG 22. A time duration from the time the address signal's high-order bits are sent to the selected BANK until the memory read data MRD is stored in read data register RD-REG 22 is shown by the time TAA in FIG. 1(b). The time TAA is obtained by adding a time required to read out data from a memory cell and a time wasted in periphery circuits, such as the memory banks, the address register ADD-REG 21 and the read register RD-REG 22. Timing for setting the memory read data MRD in the read register RD-REG 22 is determined by the time TAA. For example, when a selected BANK starts to read out memory read data MRD in stage 00 (see FIG. 1(b)) and the time TAA is 100 nanoseconds (ns) and τ is 10 ns, the memory read data MRD can be set in the read data register RD-REG 22 at the end of stage 09 and output in stage 10 as shown in FIG. 1(b). The BANK CONTROL 103 consists of a bank-address pipeline (BANK-ADD PIPELINE) 30 composed of the shift registers 39 and the decoders DEC 31, 34, 35 and 36 shown in FIG. 1(a). The decoder DEC 31 selects one of the sixteen banks via address register ADD-REG 21 explained above. Other decoders DEC 34, 35 and 36 produce bank-select signals BANK SEL09, BANK SEL10 and BANK SEL11, by decoding the outputs of shift registers 39 in BANK-ADD PIPELINE 30 corresponding to stages 09, 10 and 11, respectively. BANK-ADD PIPELINE 30 shifts the bank address (ADD low-order four bits) step by step through the registers (numbered 00, 01, 00, ..., and 11). For example, the bank select signal BANK SEL09 represents a set of 16 bank-select signals into which decoder DEC 34 decodes the output of the shift register 39 corresponding to stage 09 shown in FIG. 1(a).

The memory read data MRD set in read data register RD-REG 22 is sent to a selector SEL 23, where one of the outputs of read data register RD-REG 22 is selected by bank select signal BANK SEL10 into which decoder DEC 35 decodes the output of the shift register 39 corresponding to stage 10. The output of the selector SEL23, which will be called read data "RD" hereinafter, is sent to a selector SEL 24. In the selector SEL 24, the storing data STD sent from the memory control unit MCU 200 is combined with the read data RD sent from the selector SEL 23. (In the partial-store access and in the partial-store merge access which will be explained later, storing data STD is used as write data WD to the memory banks, so that there is a case when write data WD is sued instead of storing data STD hereinafter.) As shown in FIG. 1(b), storing data signal STD from MCU 200 is shifted an amount of 10 clock time-durations (10 τ stages) by a write data pipeline (WD PIPELINE) 10b in STORE-DATA PIPELINE 101, which is for timing storing data STD with read data RD. At the same time, byte mark signal BMK from memory control unit MCU 200 is also shifted the same amount as in WD PIPELINE 10b by a byte mark BMK pipeline (BMK PIPELINE) 10a, producing a shifted byte mark signal BMK which will be called byte mark BM hereinafter. A timing state of write data WD and byte mark BM with read RD data is shown in stage 10 in FIG. 1(b).

In the selector SEL 24, write data WD and read data RD are combined, as specified by byte mark BM. Byte mark BM consists of four bits corresponding to four bytes of write data WD, the four bits being not all zeros or all ones. When a bit in the byte mark BM is "1", a byte corresponding to the bit "1" is selected from the write data WD, and when "0", a byte corresponding to the bit "0" is selected from the read data RD, thus producing combined data CD consisting of four bytes.

The combined data CD from selector SEL 24 is set in one of the write-data registers WD-REG 27 selected by a bank select signal BANK SEL-11 from the decoder DEC 36, via the buffer register BF 25 and with an error correction code added by the check code generator CG 26. Partial-store access is performed by storing the contents of the selected write register in the selected bank.

In the partial-store access mentioned above, when partial-store access is required to be performed in the same memory address, it occurs that succeeding partial-store access is required to be newly performed in the same memory address before a preceding partial-store access is terminated. In this case, formerly, the succeeding partial-store access had to be performed after the preceding partial-store access was terminated. This caused an increase in the number of times partial store access is performed, decreasing the efficiency of the computing system. This problem has been improved by the same inventor of the present application. The improvement has been disclosed in Laid Open Japanese Patent TOKUKAISHO No. 62-38953 (1987) and TOKAISHO No. 63-129437 (1988). In these patent applications, a new partial-access method called "partial-store merge access" is disclosed. According to the partial-store merge access, the succeeding partial-store access can be performed as a part of the preceding partial-store access. The present invention relates to the further improvement of the partial-store merge access disclosed in the patents. Therefore, the partial-store merge access disclosed in the patents will be discussed in brief below, in reference to FIG. 1(c).

Figure 1C:
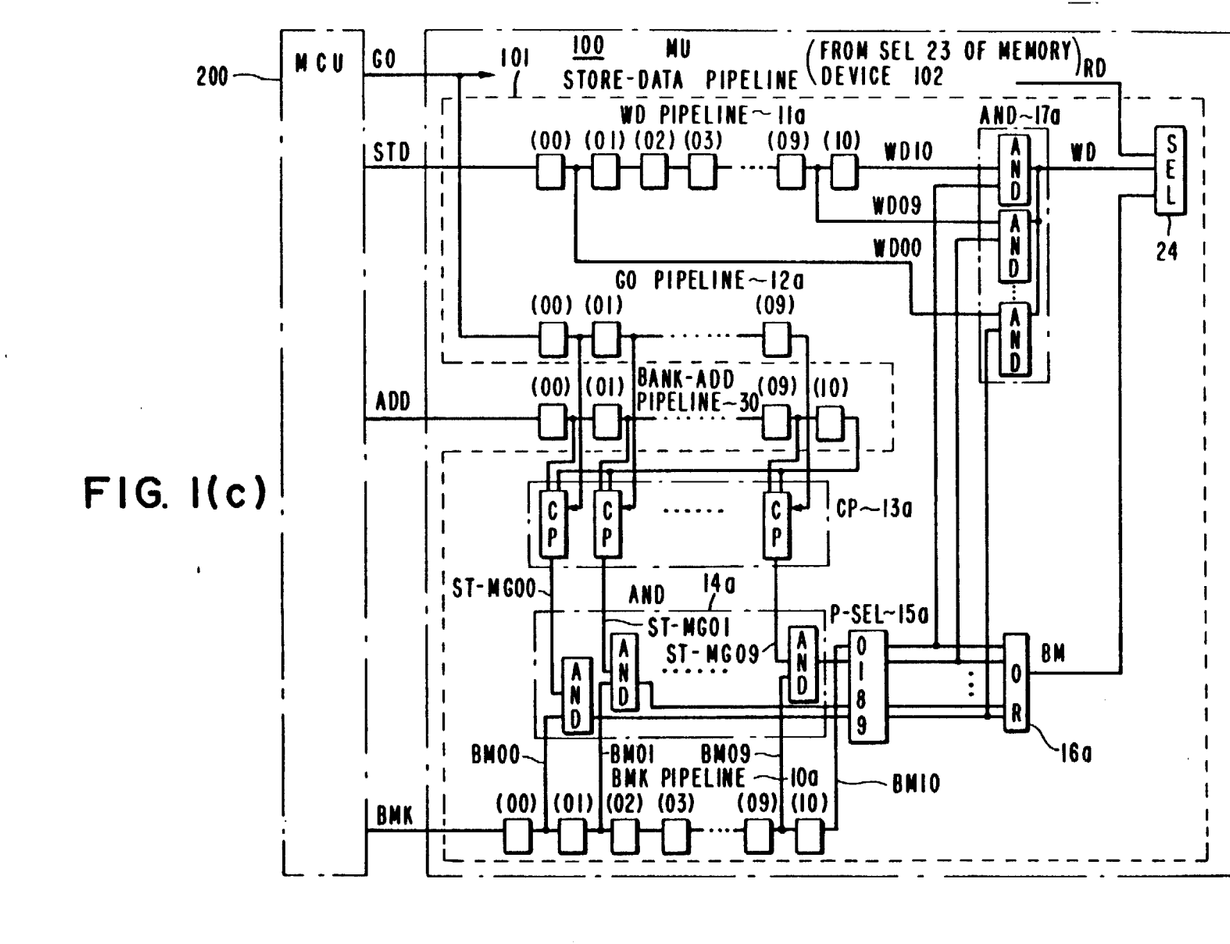
FIG. 1(c) is a schematic block diagram for illustrating function of a store-data pipeline in the partially storing control circuit in case of the related art.

FIG. 1(c) is a block diagram for illustrating the partial-store merge access disclosed in the patents, and particularly, blocks only relating to the partial-store merge access are shown in STORE-DATA PIPELINE 101 and BANK CONTROL 103 in memory unit MU 100. In FIG. 1(c), the same reference numeral as in FIG. 1(a) designates the same unit or block as in FIG. 1(a). In FIG. 1(c), signals and data such as the command signal GO, the storing data signal STD, the address signal ADD and the byte mark signal BMK are sent to the memory unit MU 100 from the memory control unit MCU 200, as in FIG. 1(a), and a command signal GO pipeline (GO PIPELINE) 12a and circuits associated with GO PIPELINE 12a are provided in STORE-DATA PIPELINE 101.

In the memory control unit MCU 200 in FIG. 1(c), when succeeding partial-store access is requested to be performed in the memory control unit MCU 200 from, for example, a central processing unit (CPU) not depicted in FIG. 1(c), while the memory unit MU 100 performs preceding partial-store access the memory control unit MCU 200 judges that the preceding partial-store access is in progress in the memory unit MU 100 and sends the command signal GO to the memory unit MU 100 with other signals such as the storing data signal STD, address signal ADD and byte mark signal BMK, to be used for the succeeding partial-store access. Command signal GO for the succeeding partial-store access is used to inform the memory unit MU 100 that succeeding partial-store access is required to be performed in the memory unit MU 100 as partial-store access is required to be performed in the memory unit MU 100 as partial-store merge access.

The partial-store merge access will be discussed in reference to FIG. 1(c), using, for convenience, WD PIPELINE 11a for only one byte storing data STD and byte mark BMK PIPELINE 10a for one bit corresponding to the one-byte storing data STD. However, one-word data read from a bank and so the storing data signal STD consists usually of 16 bytes. In this case, 15 sets of WD PIPELINEs and BMK PIPELINEs, each being the same as WD PIPELINE 11a and BMK PIPELINE 10a in FIG. 1(c), are to exist in parallel with WD PIPELINE 11a and BMK PIPELINE 10a respectively.

The storing data signal STD from MCU 200 is shifted by WD PIPELINE (composed of registers) 11a and outputs WD00, WD01, ---, WD09 and WD10 from the registers for stages 00, 01, ---, 09 and 10 are sent to the AND gates in AND circuit (AND) 17a respectively. In AND 17a, the outputs of AND gates are wire-ORed and sent to selector SEL 24 for selecting read data RD or write data WD. The operation of the selector SEL 24 will be further explained later.

The byte mark signal BMK from memory control unit MCU 200 is shifted by BMK PIPELINE (composed of registers, or in this case, flip-flops) 10a and byte mark signals (BM00, BM01, ---, BM09 and BM10) are output from the registers for stages 00, 01, ---, 09 and 10.

The command signal GO from memory control unit MCU 200 is shifted by GO PIPELINE (composed of flip-flops) 12a and the outputs of the flip-flops for stage 00, 01, - - -, 08 and 09 are sent to compare CP gates in a compare circuit 13a respectively.

Low-order four bits of the address signal ADD from the memory control unit MCU 200 are shifted by BANK-ADD PIPELINE (composed of registers) 30 and bank address signals from registers for stages 00, 01, - - -, 08 and 09 are input to compare CP gates in compare circuit 13a, respectively, together with the output of the register for stage 10.

Compare circuit 13a checks the signals from GO PIPELINE 12a to see whether command signal GO exists in GO PIPELINE 12a. Compare circuit 13a also checks the bank address at stage 10 and the bank address in each stage for coincidence to see whether there is any succeeding storing data STD in WD PIPELINE 11a to be merged with preceding STD which has advanced to stage 10 where memory read data MRD is read out. In the above, the latter check is based on a priority principle that the last-in data has the highest priority. Therefore, merge access signals (ST-MG00, ST-MG01, - - -, ST-MG08 and ST-MG09) output from respective compare CP gates of compare circuit 13a are for informing whether or not there is any succeeding partial-store merge access when the preceding partial-store access is in stage 10.

In an AND circuit (AND) 14a, the outputs of compare circuit 13a (ST-MG00, ST-MG01, - - -, ST-MG08 and ST-MG09) are ANDed with the outputs of BMK PIPELINE 10a (BM00, BM01, - - -, BM08 and BM09) by the AND gates and AND 14a respectively, and the outputs of the AND gates of AND 14a respectively, and the outputs of the AND gates are sent to priority selector (P-SEL) 15a respectively.

The P-SEL 15a is for performing priority selection of outputs of AND gates 14a, in other words, priority selection of byte mark signal BMK, based on the priority principle. Therefore, in P-SEL 15a, the last-in byte mark signal BMK is only selected even though other preceding byte mark signals BMKs exist in BMK PIPELINE 10a.

Output byte mark signal BM10 from BMK PIPELINE 10a is directly sent to P-SEL 15a. When there is no succeeding storing data STD to be partially stored, in other words, when the partial-store merge access is not required and only the partial-store access is required to be performed, only the byte mark signal BM10 is selected by P-SEL 15a, because in this case, the signals input to P-SEL 15a, because in this case, the signals input P-SEL 15a from AND 14a are all "0" except the byte mark signal BM10.

Output of P-SEL 15a is sent to OR gate (OR) 16a and AND 17a at the same time. When the output of P-SEL 15a are all "0", which means no partial-store access is required, OR 16a outputs "0" for the byte mark BM, as indicated by the byte mark BM in FIG. 1(c), to selector (SEL) 24 and AND 17a outputs nothing (all "0") to the selector SEL 24. Thus, when the output of OR 16a is "0", the selector SEL 24 selects only the read data RD to output. When the outputs of P-SEL 15a are all "0" except the output due to the byte mark signal BM10, which means only partial-store access is required, OR 16a outputs "1" to the selector SEL 24 and AND 17a selects write data WD10 to send to the selector SEL 24. Thus, when "1" is sent to the selector SEL 24 from OR 16a and WD 10 is sent to SEL 24 from AND 17a, the selector SEL 24 selects WD10 instead of read data RD for performing the partial-store access, which is the same as performing the partial-store access in FIG. 1(a). When some outputs from AND 14a to P-SEL 15a are "1" with the output due to byte mark BM10 set to "1", the last-in "1" of them is selected with first priority by P-SEL 15a to output the selected "1" therefrom. As a result, OR 16a outputs a signal "1" due to the last-in "1" and sends the "1" to the selector SEL 24, and AND 17a selects one of outputs, WD00, WD01, - - -, WD08 and WD09, of WD PIPELINE 11a, corresponding to the last-in "1". In this case, SEL 24 selects the succeeding storing data STD for performing the partial-store merge access.

As described before, DRAM has a long access time, compared with SRAM; that is, the access time of DRAM is 2 to 3 times as long as that of SRAM. Therefore, if it is supposed that SRAM has been used in MU 100 FIGS. 1(a) and 1(c) and the SRAM must be replaced with DRAM in consideration of economy, the hardware for WD PIPELINE 11a, GO PIPELINE 12a, BMK PIPELINE 10a and BANK-ADD PIPELINE 30 and the circuits associated with each pipeline would increase 2 to 3 times as much as that in case of SRAM respectively.

As the number of stages of a pipeline exceeds the number of banks, circuits associated with partial-store access increase to a great extent.

Furthermore, in case of using a pipeline, master-slave flip-flops, which are composed of more gates and are more expensive, compared with other types of flip-flops such as D-type flip-flops, are required for each pipeline to avoid a racing phenomenon occurring. The master-slave flip-flop circuit is not depicted in FIGS. 1(a) and 1(c), however, it is well known by one skilled in the art. Therefore, when the number of stages of each pipeline increases, the hardware for controlling partial-store access increases extremely.

SUMMARY OF THE INVENTION

An object of the present invention is to improve the efficiency of the partially storing control circuit used in the memory unit which has the memory device divided into a plurality of memory banks, and controlled through the interleave method.

Another object of the present invention is to decrease hardware of the partially storing control circuit.

Yet another object of the present invention is to lower the costs of the memory unit.

A further object of the present invention is to increase reliability of the partially storing control circuit.

The above objects are accomplished by excluding the store-data pipeline from the memory unit and newly providing one-word wide write-data registers and write-position registers for the memory unit instead of the store-data pipeline, corresponding to the memory banks. Each write-data register is for storing a one-word data, which includes data (partial-store data) to be partially stored, into a memory bank and each write-position register is for specifying positions of the partial-store data in the one-word data. When a partial-store access (an initial partial-store access) starts to be performed in the memory unit and other succeeding partial-store access is requested to be performed in the memory unit before the access time for the initial partial-store access elapses, incoming partial-store data from the exterior is overwritten in the write-data registers at a position designated by a write position signal input from the exterior, thus, successively renewing the partial-store data in the write-data registers, based on the principle that the last-in data has the highest priority. The contents of the write-position registers are successively ORed with the incoming write position signal and set in the write-position registers to accumulate the signal. When one-word is read out from a memory bank for performing partial-store access (initial partial-store access), succeeding partial-store access can be performed together with the initial partial-store access, by replacing the data read from the memory bank with the contents of the write-data registers in accordance with the write position signals from the write position registers.

DESCRIPTION OF THE PREFERRED EMBODIMENT

Figure 2A:
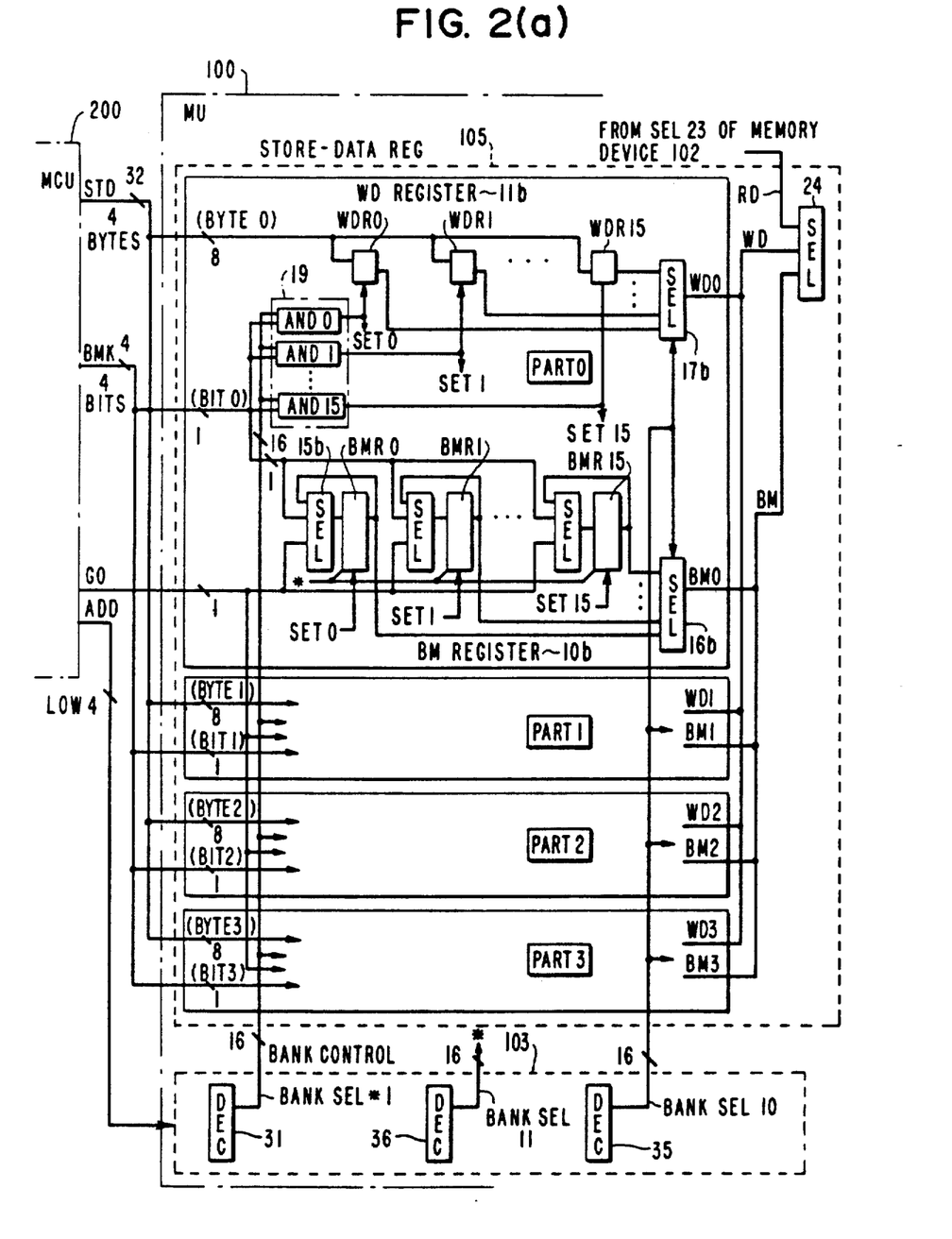
FIG. 2(a) is a block diagram of a store-data register in a partially storing control circuit embodying the present invention.
Figure 3:
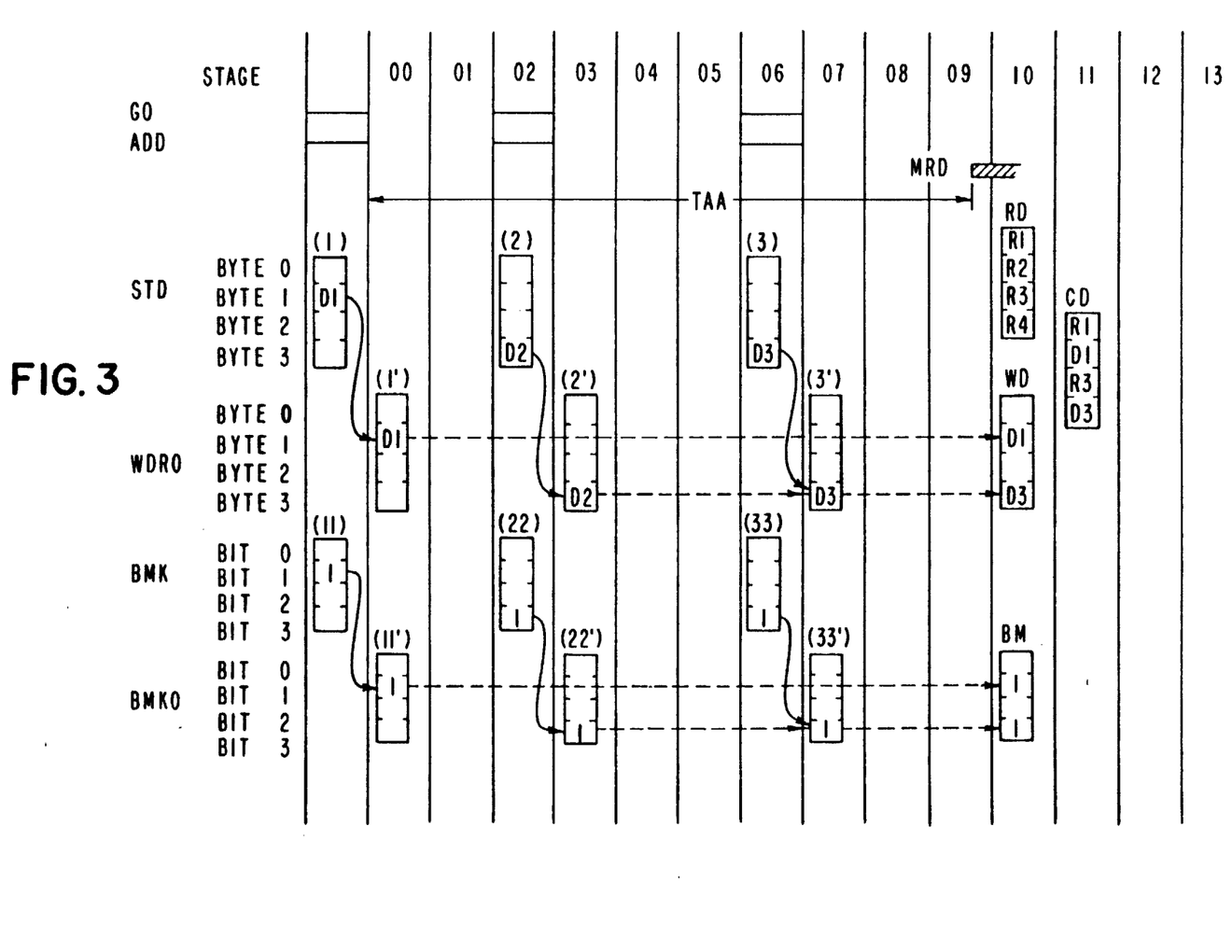
FIG. 3 is a timing chart for explaining timing of signals produced in the partially storing control circuit embodying the present invention.

FIG. 2(a) illustrates store-data register 105 in a partially storing control circuit embodying the present invention, FIG. 3 is a timing chart explaining the timing of signals produced in the partial storing control circuit shown in FIG. 2(a), based on an access time in partial-store access. In FIG. 2(a), the same numerals designate the same stage as in FIG. 1(b).

In the following description of the preferred embodiment, the storing data signal STD from MCU 200 consists of four bytes, therefore, the byte mark signal BMK from MCU 200 consists of four bits, the command signal GO from MCU 200 is used not only for performing partial-store access but also for performing partial-store merge access and the memory device is divided into sixteen memory banks, as defined in the related art explained in reference to FIGS. 1(a), 1(b) and 1(c).

FIG. 2(a) shows a store-data register (STORE-DATA REG) 105, which is an important part of the present invention. The present invention provides the store-data register 105 in memory unit MU 100 instead of the STORE DATA PIPELINE 101 as explained in the related art with reference to FIG. 1(a) or 1(c). The STORE-DATA REGISTER 105 of the embodiment illustrated in FIG. 2(a) consists of four similar parts (PARTs 0, 1, 2 and 3), corresponding respectively to the four bytes of STD (bytes 0, 1, 2 and 3), and to the four bits of the byte mark signal BMK (bits 0, 1, 2 and 3). A circuit of PART 0 for the byte 0 of STD is representatively depicted in FIG. 2(a). In each PART, there are sixteen one-byte wide write-data registers (WD REGISTER) WDR0-WDR15, sixteen byte-mark register (BM REGISTER) BMR0-BMR15 and an AND circuit (AND) 19 consisting of sixteen individual AND gates. The numbers labeling the registers (WDR0-WDR15, BMR0-BMR15) and AND gates (AND0-AND15) correspond respectively to the sixteen BANKs 0, 1, 2, - - -, 14 and 15. For example, in PART 0, WD REGISTER 11b consists of sixteen write-data registers (WDR0, WDR1, WDR2, 000, WDR14 and WDR15), BM REGISTER 10B consists of sixteen byte-mark flip-flops (BMR0, BMR1, . . . , BMR14 and BMR15) and AND circuit 19 consists of sixteen individual AND gates (AND0-AND15), as shown in FIG. 2(a).

BANK-SEL*1 from decoder DEC 31 in BANK CONTROL 103 and the byte mark signal BMK from MCU 200 are sent to the AND gate circuits in PARTs 0-3. Decoder DEC 31 generates sixteen decoded signals for the BANK-SEL*1 from the ADD and the byte mark signal BMK are ANDed respectively, and the command signal GO from MCU 200 is sent in parallel to byte mark registers (BMR0-BMR15) in parts 0-3. For example, in the case of PART0, BANK-SEL*1 and the byte mark signal BMK are sent to AND 19 and the command signal go is sent to BM REGISTER 106. In AND 19, BANK-SEL*1 and byte mark signal BMK are ANDed, so that either one of AND gates produces a "1". If byte-data to be partially stored exists in the byte 0 of storing data STD, one of the registers (WDR0-WDR15) is selected by the output "1" from AND 19, so that the byte-data is set in the selected write data register WDR.

When the partial-store access has advanced to stage 10 (see FIG. 1(b)), selector (SEL) 17b selects one of the sixteen outputs of WD REGISTER 11b (WDR0-WDR15) according to the sixteen decoded signals of BANK SEL10 applied to the selector SEL 17b from decoder DEC 35 in BANK CONTROL 103 (see FIG. 1(a)) to output byte-data. The byte-data output from SEL 17b will be called a "write-data 0" hereinafter and indicated as "WD 0" in FIG. 2(a). In the same way as the above write-data WD1, WD2 and WD3 are output from PART 1, 2 and 3 to the selector SEL 24, respectively.

Figure 2B:
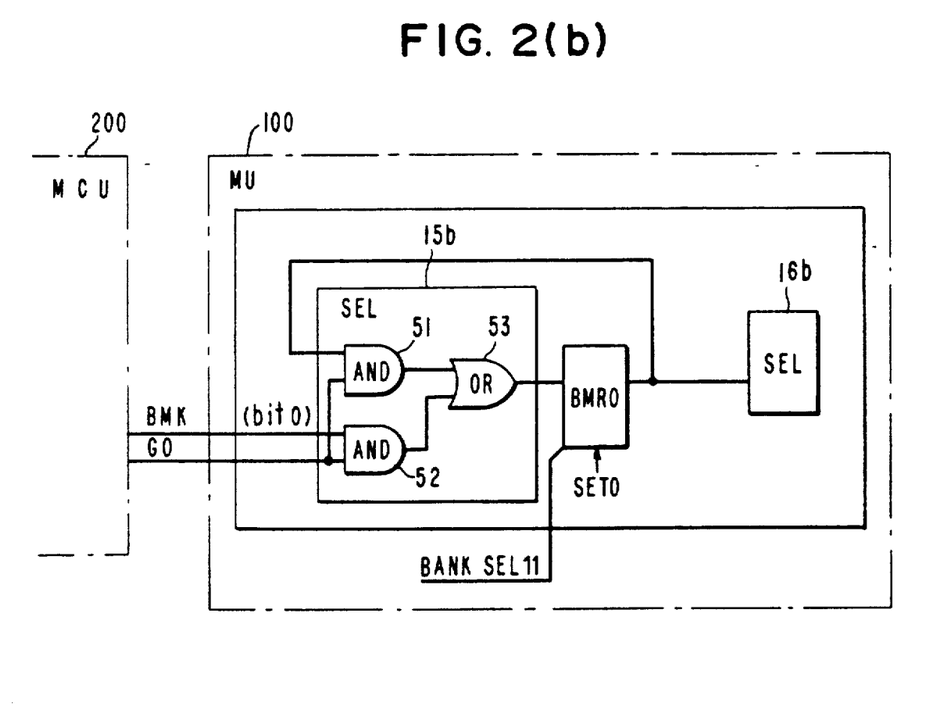
FIG. 2(b) is a circuit of a selector used with a byte-mark register in the store-data register.

Meanwhile, when byte-data to be partially stored exists in byte 0 of the storing data STD, one of SETs 0-15 becomes "1" and selects one of byte mark registers BMRs 0-15 BM REGISTER 10b to set the byte mark signal BMK bit 0 in the selected byte mark register BMR corresponding to the selected write data register WDR. Each byte mark register BMR is a D-type flip-flop provided with a selector (SEL) which is representatively numbered as "SEL 15b" in FIG. 2(a). Combining thus the D-type flip-flop byte mark register BMR with the selector is for performing partial-store merge access, and FIG. 2(b) shows the combined circuit for the byte mark register BMR 0. In FIG. 2(b), the same reference numeral as in FIG. 2(a) designates the same part as in FIG. 2(a).

The partial-store merge access performed using the circuit shown in FIG. 2(b) will be explained in reference to a timing chart in FIG. 3. In FIG. 3, the same reference numeral or symbol as in FIG. 1(a) designates the same as those in FIG. 1(b).

In FIG. 2(b), the selector SEL 15b consists of two AND gates (ANDs 51 and 52) and an OR gate (OR 53) connected to byte mark register BMR 0. When byte-data to be partially stored in memory unit MU 100 exists in byte 0 of storing data STD, bit 0 of the byte mark signal BMK from the memory control unit MCU 200, which will be written "BMK (bit0)", hereinafter, is "1", so that SET 0 from AND gate 19 becomes "1". Byte mark signals BMK (bit 0) and command signal GO are sent to AND 52 of SEL 15b and SET 0 is sent to BMR 0. When the byte mark signal BMK (bit 0) is "1" and the command signal GO from the memory control unit MCU 200 is also "1", the output of AND gate 52 becomes "1" and is sent to OR 53 from which "1" is output. When the output of OR 53 is "1" and byte mark register BMR 0 is triggered by SET 0, byte mark register BMR 0 is set to "1". There is another AND gate 51 (AND 51) having two inputs connected to the output of byte mark register BMR0 and command signal GO and the output connected to another input of OR 53. When the output of BMR 0 is "1" and the command signal GO is activated, AND gate 51 outputs "1", then OR gate 53 outputs "1", thus retaining the "1" state of byte mark register BMR 0. Therefore, once byte mark register BMR 0 is set to "1" due to the byte mark register BMK (bit 0) of preceding partial-store access, byte mark register BMR 0 always outputs "1", even if byte mark signal BMK (bit 0) of succeeding partial-store access is "0" and AND 52 does not output "1". Byte mark BM0 retains the set "1" state until cleared by BANK SEL11 of BANK-ADD PIPELINE 30.

Therefore, in memory unit MU 100, when a plurality of commands for partial-store access to the same address in BANK 0, for example, are required to be performed successively, within the access time for an initial partial-store access, in other words, when partial-store merge access is required to be performed, the partial-store merge access can be performed as follows in reference to a timing chart in FIG. 3:

The command signal GO, the address signal ADD designating BANK 0 and STD (1) including byte-data D1 in byte 1 are initially set to memory unit MU 100 from memory control unit MCU 200 to partially store D1 in BANK 0 as shown on the left-upper side of FIG. 3, and at the same time, the byte mark signal BMK (11) including "1" in bit 1 is sent to memory unit MU 100 from memory control unit MCU 200 as shown on left-lower side of FIG. 3.

BANK CONTROL 103 (see FIG. 1(a)) starts advancing the state from 00, that is, starts advancing the bank address (in this case, bank address 0) through BANK-ADD PIPELINE 30 as shown on upper side of FIG. 3, and at the same time, the command signal GO, the storing data signal STD (1) and the byte mark signal BMK (11) are sent to PART 1 of STORE-DATA REG 105 (see FIG. 2(a)), where, in stage 00, the storing data signal STD (1) including D1 is set in the write data register WDR 0 (1') of PART 1, not depicted in FIG. 2(a), when activated by SET 0 output from AND 19, not depicted in FIG. 2(a). The byte mark signal BMK (11) is set in BMR 0 (11') of PART 1, not depicted in FIG. 2(a), as shown on left-lower side of FIG. 3.

When the initial partial-store access is in the stage 02, and when another command signal GO, address signal ADD designating the same BANK 0, storing data STD (2) including another byte data D2 in byte 3 and byte mark signal BMK (22) including "1" in bit 3 are sent to memory unit MU 100, storing data STD (2) is set in write data register WDR 0 (2') of PART 3, not depicted in FIG. 2(a), and byte mark signal BMK(22) is set in byte mark register BMR 0 (22') of PART 3, not depicted in FIG. 2(a).

When the initial partial-store access is in stage 06, and still another command signal GO, address signal ADD designating the same BANK 0, storing data STD (3) including still another byte-data D3 in bytes and byte mark signal BMK (33) including "1" in bit 3, storing data STD (3) is set in write data register WDR0 which was stored due to STD (2) is replaced with D3. Byte mark register BMK (33) is set in byte mark register BMR0 (33') of PART 3, thus retaining the "1" in bit 3 of BMR 0 which was stored due to byte mark signal BMK (22).

When the initial partial-store access advanced to stage 10, BANK SEL 10 applied to the selector SEL 17b and the selector SEL 16b of PARTs 1 and 3, not depicted in FIG. 2(a), gates out write data WD including D1 and D3 in bytes 1 and 3 respectively to the selector SEL 24 (see FIG. 2(a)), where byte-data R1 and R3 in byte 1 and 3 respectively, of read data RD are replaced with D1 and D3 respectively, producing combined data CD consisting of R0, D1, R3 and D3, as shown in FIG. 3.

What is claimed is:

1. An apparatus for controlling partial storage of data from a memory control unit, said apparatus comprising:
 a bank control circuit to generate a plurality of bank control signals;
 a plurality of parts operatively coupled to the bank control circuit, each said part including
  an AND circuit operatively coupled to said bank control circuit and a word mark signal from the memory control unit to generate set signals;
  a plurality of write data registers operatively coupled to a word signal from the memory control unit and said AND circuit to store the word signal in one of said write data registers selected by the set signal;
  a plurality of word mark registers operatively coupled to the word mark signal from the memory control unit and said AND circuit to store the word mark signal in one of said word mark registers selected by the set signal;
 a write data selector operatively coupled to said plurality of write data registers and said bank control circuit to select a write data register for output based on the bank control signals; and
 a word mark selector operatively coupled to said plurality of word mark registers and said bank control circuit to select a word mark register for output based on the bank control signals.

2. An apparatus according to claim 1, wherein said bank control circuit includes a plurality of delay circuits to generate at least a first bank control signal first in time and a second bank control signal second in time.

3. An apparatus according to claim 2, wherein said AND circuit is responsive to the first bank control signal from said bank control circuit and said write data and word mark data selectors are responsive to the second bank control signal from said bank control circuit.

4. An apparatus according to claim 1, further comprising a plurality of selectors, each selector operatively coupled to a corresponding word mark register, the word mark signal from the memory control unit and a control signal from the memory control unit, to determine data to be stored in the corresponding word mark register based on the control signal and data presently stored in the corresponding word mark register.

5. A method of controlling partial storage of data, said method comprising the steps of:

(a) generating a plurality of bank control signals;

(b) receiving a number of n words from a memory control unit;

(c) receiving a number of n word mark signals from the memory control unit;

(d) generating a number of n·$2^n$ set signals for n parts based on the bank control signals and the word mark signals;

(e) storing respective first through nth words received in step (b) in respective first through nth parts based on the set signals;

(f) storing respective first through nth word mark signals received in step (c) in respective first through nth parts based on the set signals;

(g) selecting in each part one of the first through nth words and one of the first through nth word mark signals; and (h) selecting at least one of the words and the word mark signals selected in step (g); and (i) repeating steps (a) through (h) for another number of n words.

6. A method according to claim 5,
wherein said method further comprises the step of (j) receiving an address signal from the memory control unit; and
wherein said plurality of bank control signals generated in step (a) are generated based on the address signal received in step (j).

7. A method according to claim 6, wherein each of the plurality of bank control signals generated in step (a) is generated by delaying the control signal by a predetermined number of stages and generating particular bank control signals at particular stages.

8. A method according to claim 5, wherein said generating of the set signals in step (b) includes the step of (b1) logically ANDing a first bank control signal and the respective word mark signal for each respective part.

9. A method according to claim 8, wherein said selecting in step (h) selects based on a second bank control signal.

10. A method according to claim 9, wherein the word mark signal stored by said storing in step (f) stores a word mark signal in a register until cleared by a third bank control signal.

11. A method according to claim 10, wherein said generating in step (a) generates the first bank control signal first in time, generates the second bank control signal second in time, and generates the third bank control signal third in time.

12. A method according to claim 5, wherein said storing in step (e) stores each word in one of $2^n$ registers designated by one of $2^n$ set signals for each part.

13. A method according to claim 12, wherein said storing in step (f) stores each word mark signal in one of $2^n$ registers designated by one of $2^n$ set signals for each part.

14. A method according to claim 15, wherein said storing in step (f) stores each word mark signal in one of $2^n$ registers designated by one of $2^n$ set signals for each part.

15. A method according to claim 14, wherein when said storing in step (f) stores a word mark signal in a register, the word mark signal remains stored until cleared by a particular bank control signal.

16. A method according to claim 5,
wherein said method further comprises the step of (j) receiving a command signal from the memory control unit; and
wherein said storing in step (f) stores a word mark signal in a register when the command signal received in step (j) commands a go condition and the register is empty.

17. A method according to claim 16, wherein said storing in step (f) retains the word mark signal stored in the register when the command signal received in step (j) commands a go condition and the register is full.

18. A method according to claim 17, wherein said storing in step (f) clears the register when the command signal commands a no go condition.

19. A method according to claim 5, wherein said selecting in step (h) selects based on a particular bank control signal.

20. A partially storing control circuit used in a memory unit including a memory device, for performing partial-store access of the memory device, said partially storing control circuit comprising:

read out means for starting the memory device when an initial access command is received by the memory unit from outside of the memory unit and for reading out read-data including a plurality of data portions after a memory access time;

first register means for storing write-data including a plurality of data portions at a position of a data portion thereof designated by positioning signals when the initial access command is received and for overwriting the write-data on the data stored therein, when a following access command is received during the memory access time started by the initial access command, the overwriting being performed for a data portion designated by the positioning signals, the write-data, the positioning signals and the following access command being received by the memory unit from the outside of the memory unit;

second register means for storing the positioning signals when the initial access command is received and for storing a logical OR of the data stored therein and the positioning signals when the following access command is received during the memory access time;

combining means for replacing the read-data with the data stored in said first register means after the memory access time to produce rewrite-data, the replacing being performed for a data portion designated by the data stored in said second register means; and means for storing the rewrite-data in the memory device.

21. A partially storing control circuit according to claim 20, wherein said first register means resets itself when the storing of rewrite-data ends, and overwrites the write-data on the data stored therein, when any of the initial and following access commands is received, the overwriting being performed for a data portion designated by the positioning signals, and wherein said second register means resets itself when the storing of rewrite-data ends and stores a logical OR of the data stored therein and the positioning signals when any of the initial and following access command is received during the memory access time.

22. A partially storing control circuit according to claim 21, wherein said first register means comprises registers which are operatively connected to the respective data portions of the write-data, and AND gates which are responsive to the respective positioning signals and the bank select signals and are operatively connected to said registers.

23. A partially storing control circuit according to claim 21, wherein said second register means comprises any of J-K flip-flops with an AND gate operatively connected thereto, the AND gate being responsive to the respective positioning signal and the initial and following access commands, and D-type flip-flops with an AND-OR gate operatively connected thereto, one of the two AND gates of the AND-OR gate being responsive to the respective positioning signal and the initial and following access commands and the other AND gate being responsive to an output of respective said D-type flip-flop and the initial and following access commands.

24. A partially storing control circuit according to claim 20, wherein the overwriting on said first register means and the logical OR on said second register means are performed when the following access command is directed to the same data as directed by the initial command.

25. A partially storing control circuit used in a memory unit including a plurality of memory banks of memory devices, for performing a partial-store access of every memory bank through an interleave method, said partially storing control circuit comprising:

read out means for starting the memory device of a memory bank designated by bank select signals when a initial access command is received and for reading out read-data including a plurality of data portions after a memory access time, the initial access command and the bank select signals being received by the memory unit from outside of the memory unit;

first register means, corresponding to each memory bank, for storing write-data including a plurality of data portions at a position of a data portion thereof designated by positioning signals when the initial access command is received and for overwriting the write-data on the data stored therein, when a following access command is received during the memory access time started by the initial access command, the overwriting being performed for the data portion designated by the positioning signals, the write-data, the positioning signals and the following access command being received by the memory unit from the outside of the memory unit;

second register means, corresponding to each memory bank, for storing the positioning signals when the initial access command is received and for storing a logical OR of the data stored therein and the positioning signals when the following access command is received during the memory access time;

combining means for replacing the read-data with the data stored in said first register means after the memory access time to produce rewrite-data, the replacing being performed for a data portion designated by the data stored in said second register means; and means for storing the rewrite-data in the memory device of the memory bank.

26. A partially storing control circuit according to claim 25, wherein said first register means resets itself when the storing of rewrite-data ends and overwrites the write-data on the data stored therein, when any of the initial and following access commands is received, the overwriting being performed for a data portion designated by the positioning signals, and wherein said second register means resets itself when the storing of rewrite-data ends and stores a logical OR of the data stored therein and the positioning signals when any of the initial and following access command is received during the memory access time.

27. A partially storing control circuit according to claim 25, wherein the overwriting on said first register means and the logical OR on said second register means are performed when the following access command is directed to the same data as directed by the initial command.

28. A partially storing control circuit according to claim 26, wherein said first register means comprises registers which are operatively connected to the respective data portions of the write-data, and AND gates which are responsive to the respective positioning signals and the bank select signals and are operatively connected to said registers.

29. A partially storing control circuit according to claim 26, wherein said second register means comprises any of J-K flip-flops with an AND gate operatively connected thereto, the AND gate being responsive to the respective positioning signal and the initial and following access commands, and D-type flip-flops with an AND-OR gate operatively connected thereto, one of the two AND gates of the AND-OR gate being responsive to the respective positioning signal and the initial and following access commands and the other AND gate being responsive to an output of respective said D-type flip-flop and the initial and following access commands.

* * * * *